(12) United States Patent
Moon et al.

(10) Patent No.: US 7,196,970 B2
(45) Date of Patent: Mar. 27, 2007

(54) ULTRASONIC RANGING SYSTEM AND METHOD THEREOF IN AIR BY USING PARAMETRIC ARRAY

(75) Inventors: Wonkyu Moon, Kyungsangbuk-do (KR); Haksue Lee, Kyungsangbuk-do (KR)

(73) Assignee: Postech Foundation, Kyungsangbuk-do (KR)

( * ) Notice: Subject to any disclaimer, the term of this patent is extended or adjusted under 35 U.S.C. 154(b) by 177 days.

(21) Appl. No.: 10/960,083

(22) Filed: Oct. 8, 2004

(65) Prior Publication Data
US 2005/0276163 A1     Dec. 15, 2005

(30) Foreign Application Priority Data
Jun. 9, 2004     (KR) ..................... 10-2004-0042299

(51) Int. Cl.
*G01S 15/00*     (2006.01)
(52) U.S. Cl. ....................................................... 367/92
(58) Field of Classification Search .................. 367/92
See application file for complete search history.

(56) References Cited

U.S. PATENT DOCUMENTS 4,308,599 A * 12/1981 Thiele .......................... 367/92

FOREIGN PATENT DOCUMENTS

| JP | 8-80300 | 3/1996 |
|---|---|---|
| JP | 10-73654 | 3/1998 |
| JP | 2000-111645 | 4/2000 |

* cited by examiner

*Primary Examiner*—Dan Pihulic
(74) *Attorney, Agent, or Firm*—Bacon & Thomas, PLLC

(57) ABSTRACT

An ultrasonic ranging method for measuring a distance to an object in an air includes the steps of generating a first and a second primary ultrasonic waves having a frequency $f_1$ and $f_2$, respectively, transmitting the first and the second primary ultrasonic waves in a same direction, wherein a secondary ultrasonic wave having a frequency corresponding to the difference of two frequencies $f_d = f_1 - f_2$ is created by a non-linear property of the air and radiated to the object, detecting an echo pulse of the secondary ultrasonic wave reflected from the object, and measuring the distance to the object based on a propagation time of the secondary wave.

13 Claims, 7 Drawing Sheets

ULTRASONIC RANGING SYSTEM AND METHOD THEREOF IN AIR BY USING PARAMETRIC ARRAY

FIELD OF THE INVENTION

The present invention relates to an ultrasonic ranging system and method thereof; and, more particularly, an ultrasonic ranging system and method for measuring a distance to an object based on a propagation time of an ultrasonic pulse by generating the ultrasonic pulse toward an object in an air and detecting an echo pulse reflected therefrom.

BACKGROUND OF THE INVENTION

Currently, there are introduced several methods for measuring a distance to an object by using an ultrasonic wave in an air. Representative examples of the distance measuring method employing the ultrasonic wave are, for example, a pulse echo method, a phase angle method, a frequency modulation method and a correlation method. Among those methods, the pulse echo method is the most simple and has been adopted for long period of time in many areas such as a ranging sensor in a mobile robot and an intelligent traffic system.

Herein, therefore, there will be described a method which is substantially related to the pulse echo method. In the pulse echo method, an ultrasonic pulse having a frequency ranging from about 20 kHz to about 100 kHz is generated and transmitted to an object at time $T_0$. Then, the ultrasonic pulse is reflected from the object, thereby an echo pulse of the ultrasonic pulse being detected by a sensor at time $T_1$. In this regard, a propagation time of the pulse can be defined to be $(T_1-T_0)$ and, accordingly a distance to the object can be given by a half of a multiplication of the propagation time and a velocity of an ultrasonic wave c, i.e., $(0.5 \times (T_1-T_0) \times c)$, wherein a velocity of an ultrasonic wave c is a known value.

One of good reasons to adopt an ultrasonic wave having a frequency ranging from 20 kHz to 100 kHz is to implement a high directivity of a ultrasonic pulse in the air. Generally, when a piston-shaped ultrasonic wave generator having a radius a harmonically oscillates with a frequency set to f, an ultrasonic wave beam propagates through the air with a form of a nearly planar wave in a near field. However, the beam becomes spread wide, thereby having a form of a circular cone in a far field, by a diffraction thereof in proportional to a propagating distance. Accordingly, a beam width becomes larger as the wave propagates farther from the wave generator and, consequently, an angle is formed between an outermost sideline of the propagating beam and a central direction line of the propagation. Such formed angle is defined as an angle of divergence θ can be defined as:

$$\theta = \sin^{-1}[0.61 \times c/(f \times a)] \quad \text{Eq. 1,}$$

as disclosed in "Fundamentals of Acoustics", (4$^{th}$ edition, Wiley, New York, 1982 authored by L. Kinsler, A. Frey, Coppens and J. Sanders), wherein c is the velocity of an ultrasonic wave, f is the frequency of the ultrasonic wave and a is the radius of the ultrasonic wave generator.

In other words, the angle of convergence of the ultrasonic wave is inversely proportional to the frequency f and the radius α of the piston-shaped ultrasonic wave generator. As the angle of convergence becomes smaller, the beam width of the ultrasonic wave becomes narrower and, resultantly, a spatial resolution can be increased. Therefore, it is generally desirable to minimize the beam width to achieve a high resolution in a spatial domain.

Referring to Eq. 1 and the aforementioned relation between the angle of convergence and the beam width of the ultrasonic wave, the beam width is minimized by increasing the frequency f of the ultrasonic wave. However, the method of increasing the frequency of the ultrasonic wave has a drawback that a measurable range of a distance decreases, because the ultrasonic wave is attenuated in proportional to square of the frequency. Another method for minimizing the beam width is to increase the radius a of the piston-shaped ultrasonic wave generator. However, it is practically difficult to implement the larger radius of the piston-shaped ultrasonic wave generator mechanically. Furthermore, a size of a sensor therein becomes large in proportional to the diameter thereof. For the reasons stated above, the commonly used sensors has the radius a which is less than or equal to 15 mm, and measures the distance by using the ultrasonic wave at the frequency of 40 kHz.

Meanwhile, a directivity characteristic of the sensors can be represented with a half power beam width $2\theta_{HP}$ (hereinafter, referred to as HPBW for simplicity). For example, for a commonly used sensor having the radius of 12 mm and using the frequency of 40 kHz, the HPBW is known to be about 20 degrees. In this case, the beam width of the wave becomes larger than 1 m at a 5 m distant place from the sensor. In this regard, although the beam width is also slightly dependent on other factors, e.g., duration of the pulse or a source type (piston source or Gaussian source), the sensor having the aforementioned directivity characteristic is generally called to have the spatial resolution of 1 m at a 5 m distant place from the sensor.

As described above, the conventional ultrasonic distance measuring method has a limitation in reducing the beam width of the ultrasonic wave pulse, in that a pulse having the high frequency is directly transmitted, reflected and detected for the ranging. Consequently, the conventional method has the drawback of poor resolution in the spatial domain.

Still another drawback of the conventional ultrasonic distance method is that a side lobe is formed in a direction other than the central direction of the propagation, while a main component of the ultrasonic pulse is propagating into the central direction thereof. The side lobe can be reflected to an unintended object such that an undesirable echo pulse, which is the reflected pulse of the side lobe, may be detected prior to detecting the reflected pulse of the main component thereof. Consequently, the side lobe causes a cross talk, thereby making it difficult to measure the distance to the target object precisely. Therefore, it is important to suppress the side lobe in a technology area where the ultrasonic sensors are applied.

SUMMARY OF THE INVENTION

It is, therefore, an object of the present invention to provide an ultrasonic ranging system and a method thereof for measuring a distance to an object in an air by using a pulse of difference frequency wave created during a propagation in an air after transmitting an ultrasonic pulse generated by a parametric array which has been used in an underwater low frequency active SONAR (SOund NAvigation Ranging) system.

In accordance with one aspect of the invention, there is provided an ultrasonic ranging method for measuring a distance to an object in an air, including the steps of: generating a first and a second primary ultrasonic waves having a frequency $f_1$ and $f_2$, respectively; transmitting the first and the second primary ultrasonic waves in a same direction, wherein a secondary wave having a frequency corresponding to a difference of two frequencies $f_d=f_1-f_2$ is created by a nonlinear property of the air and radiated to the object as a pulse shape; detecting an echo pulse of the secondary wave reflected from the object; and measuring the distance to the object based on a propagation time of the secondary wave.

In accordance with another aspect of the invention, there is provided an ultrasonic ranging system for measuring a distance to an object in an air, including: a controller for initializing a device and generating a plurality of control signals; a first and a second pulse generators, each of which simultaneously generates a first and a second pulse signals, respectively triggered by one of the control signals from the controller; a modulator for producing a modulated pulse signal by superposing the first and the second pulse signals generated from each of the first and the second pulse generators; a first amplifier amplifying the modulated pulse signal; a reversible ultrasonic wave transducer for transmitting an ultrasonic pulse into the air by transforming the amplified pulse signal into a mechanical energy, receiving an echo pulse reflected from the object and further transforming the echo pulse into a received electrical signal; a second amplifier amplifying the received electrical signal; a high speed switch for forwarding the modulated pulse signal amplified by the first amplifier to the reversible ultrasonic transducer and delivering the received electrical signal from the reversible ultrasonic wave transducer to the second amplifier, respectively; a band pass filter for selectively passing a low frequency signal component of the received electrical signal; and a ranging processor for calculating the distance to the object by using an input time of the modulated pulse signal from the modulator and an input time of the received electrical signal from the band pass filter.

In accordance with still another aspect of the invention, there is provided an ultrasonic ranging system for measuring a distance to an object in an air, including: a controller for initializing a device and generating a plurality of control signals; a first and a second pulse generators, each of which simultaneously generates a first and a second pulse signals, respectively triggered by one of the control signals from the controller; a modulator for producing a modulated pulse signal by superposing the first and the second pulse signals generated from each of the first and the second pulse generators; a first amplifier amplifying the modulated pulse signal; an ultrasonic wave actuator for transmitting an ultrasonic pulse into the air by transforming the amplified pulse signal into a mechanical energy; an ultrasonic wave sensor for receiving an echo pulse reflected from the object and further transforming the echo pulse into a received electrical signal; a second amplifier amplifying the received electrical signal; a band pass filter for selectively passing a signal component of the received electrical signal; and a ranging processor for calculating the distance to the object by using an input time of the modulated pulse signal from the modulator and an input time of the received electrical signal from the band pass filter.

BRIEF DESCRIPTION OF THE DRAWINGS

The above and other objects and features of the present invention will become apparent from the following description of preferred embodiments, given in conjunction with the accompanying drawings, in which:

FIGS. 1A and 1B explain a physical phenomenon of generation of a difference frequency wave, particularly

FIGS. 3A to 3D depict graphs showing simulation results, particularly

DETAILED DESCRIPTION OF THE PREFERRED EMBODIMENT

Hereinafter, a preferred embodiment of an ultrasonic ranging system and method thereof for measuring the distance to the object by using a parametric array in accordance with the present invention will be described in detail with reference to the accompanying drawings. In the specification and the accompanying drawings, like reference numerals will be given to like parts having substantially same functions and redundant description thereof will be omitted.

A technology of generating a difference frequency wave by using a parametric array has been applied to an underwater low frequency active SONAR (Sound Navigation Ranging) system used. According to "Nonlinear underwater acoustics", (The American Institute of Physics, New York, 1987) authored by B. K. Novikov, O. V. Rudenko, and V. I. Timoshenko, the technology using parametric array has been widely adopted due to advantages that a low frequency wave corresponding to the difference frequency wave, which has a high directivity, may be generated by using a small high frequency transducer.

Figure 1A:
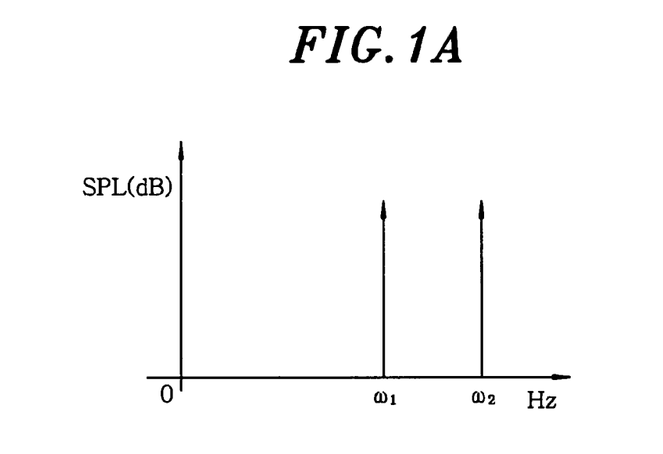
FIG. 1A shows a spectrum of two primary ultrasonic waves (hereinafter, referred to as primary waves, for simplicity), each of which generated from an ultrasonic wave generator.
Figure 1B:
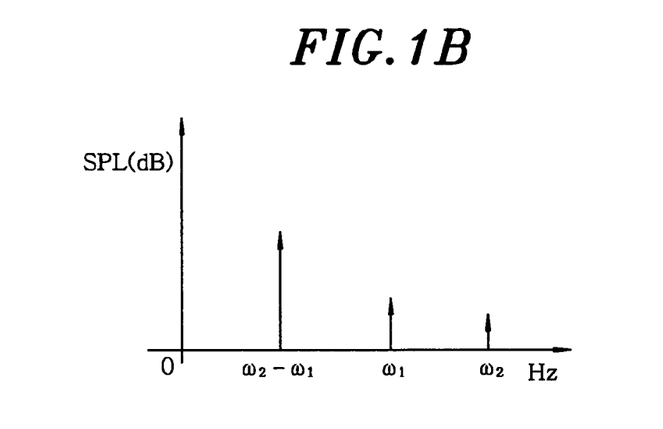
FIG. 1B shows a spectrum of a secondary ultrasonic wave (difference frequency wave) together with a spectrum of two primary waves at a predetermined distance from the ultrasonic generator and FIG. 1C presents a schematic view explaining a generation of the difference frequency wave in spatial domain.
Figure 1C:
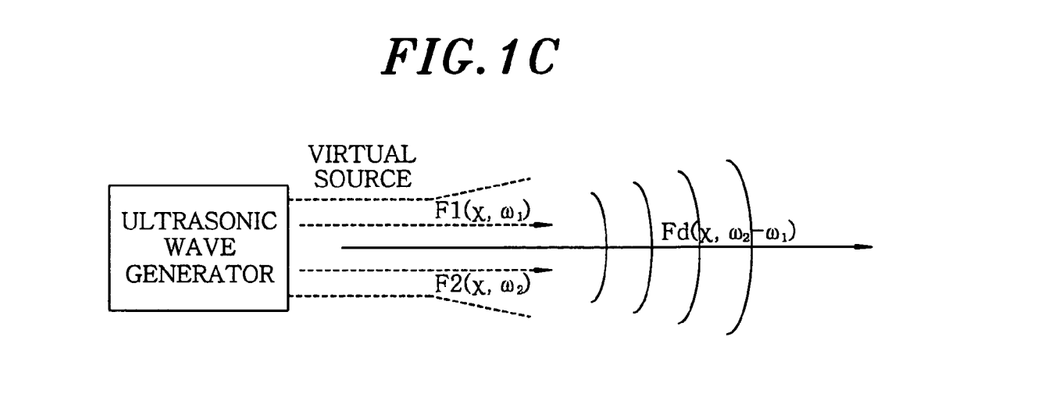

Referring to FIGS. 1A to 1C, the difference frequency wave is created by transmitting two ultrasonic waves, each of which having a high frequency $f_1=\omega_1/2\pi$ and $f_2=\omega_2/2\pi$, respectively into a same direction (hereinafter, the high frequency waves are referred to primary waves). Then, many of subsidiary waves having the frequency of $2f_1$, $2f_2$, $f_1-f_2$, $f_1+f_2$ and the like are created due to a nonlinear effect of an air while propagating therethrough (hereinafter, the subsidiary waves are referred to secondary waves). Among the primary and secondary waves, those having a relatively high frequency such as $f_1$, $f_2$, $2f_1$, $2f_2$, $f_1+f_2$ become negligible due to the high attenuation of the high frequency waves while propagating through a medium, particularly for the case that $f_1-f_2$ is much smaller than $f_1$ or $f_2$ comparatively.

Accordingly, a wave having relatively low frequency, $f_1-f_2$ is used as an ultrasonic wave to measure the distance to the object. A physical phenomenon described above is schematized in FIG. 1C, and an area around a near field where a nonlinear effect is dominant is called as a virtual source of the difference frequency wave. Referring to FIG. 1B, frequency components of the propagating wave are shown at a certain distance from the ultrasonic wave generator. A sound pressure level (SPL) of the difference frequency wave is higher than those of frequencies of the wave originally transmitted from an ultrasonic wave generator. In a method employing the parametric array, the nonlinearity phenomena is basically used such that the high frequency wave having high SPL should be generated efficiently to create the difference frequency wave while the generated high frequency waves are propagating in the medium.

In an underwater condition, an impedance of the transducer is matched properly with that of the medium, thereby a high radiation efficiency is provided. Further, an efficiency of the difference frequency wave generation is also high due to a high non-linear characteristic of the medium, i.e., water. In accordance with a Westervelt model disclosed in Nonlinear wave processes in acoustics, Cambridge University Press, New York, 1998 authored by K. Naugolynkh and L. Ostrovsky, the efficiency of the difference frequency wave generation K for the two high frequency is given by:

$$K=(p_0/\rho_0 c^2)^2 \times (k_d \times a)^2 \times (k_d/64\pi\alpha) \quad \text{Eq. 2,}$$

wherein $\alpha$ is a attenuation constant of the primary wave, $p_0$ is the SPL of the primary wave, a is the radius of the generator and $k_d=2\pi f_d/c$, $f_d=f_1-f_2$ reflects the difference of the two primary waves. To obtain the high efficiency of the difference frequency wave generation, the SPL of the primary waves should be high, the radius of the generator should be large and the difference between the frequencies of the two primary waves should be also large.

However, the non-linearity property of an air is weak and further the impedance matching between the air and the ultrasonic wave generator is difficult. Therefore, an application of the parametric array was regarded as practically impossible to be applied in the medium of the air.

In the mean time, it was proven to be possible experimentally to adopt the parametric array even in the air by Blackstock, of which the fact is disclosed in "Parametric array in air," J. Acoust. Soc. Am. Vol. 57(3), pp. 562–568, 1975, Mar. authored by Mary Beth Bennett and David T. Blackstock. Further, the method using the parametric array has been actively researched in an application area of a directional loudspeaker (parametric loudspeaker) generating an audible sound, a bandwidth of which limited to range from 20 Hz to 20 kHz.

However, the method using the parametric array has never been used to provide an ultrasonic distance measurement in the air. Hereinafter, there will be described in detail a ultrasonic ranging system and method thereof for measuring the distance to the object, substantially based on the pulse echo method, by generating ultrasonic waves by using the parametric array and then detecting a wave having the difference frequency created during the propagation, which is reflected from the object.

To achieve a long range of a measurable distance in the air, the difference frequency wave should have a high SPL because the reflected wave of the difference frequency should be detected efficiently at a sensor. For this purpose, two ultrasonic wave generators are introduced to generate the primary waves with high frequency difference and high output power sufficient to generate the difference frequency wave having a high SPL, and then two of generated primary waves are modulated electrically prior to being transmitted into the air. In this method, the side lobes are also suppressed by using the difference frequency wave for measuring the distance in the air.

Generally, the nonlinear interactions in the parametric array take place mainly in a near field or a far field according to the cases. According to "Nonlinear underwater acoustics", (The American Institute of Physics, New York, 1987) authored by B. K. Novikov, O. V. Rudenko and V. I. Timoshenko, a directivity function of the difference frequency wave when the nonlinear interactions are dominant in the near field is given by:

$$D_d(\theta) = \frac{\alpha/k_d}{[\sin^4(\theta/2) + (\alpha/k_d)^2]^{1/2}}, \quad \text{Eq. 3}$$

wherein $\alpha$ is a attenuation constant of the primary wave, $\theta$ is the angle from the central axis of the piston and $k_d=2\pi f_d/c$, $f_d=f_1-f_2$ reflects the difference frequency of the two primary waves.

In other words, the directivity of the difference frequency wave in the near field source case becomes degraded as the frequencies of the primary waves increase for the identical difference frequency, because of the attenuation effect.

Meanwhile, according to the same reference as that of a near field source case, a directivity function of the difference frequency wave when the nonlinear interactions are dominant in the far field is given by:

$$D_d(\theta) \approx D_1(\theta) \times D_2(\theta) \quad \text{Eq. 4,}$$

wherein $D_1(\theta)$ and $D_2(\theta)$ are the directivity functions of the first and the second primary waves, respectively.

In other words, the directivity function of the difference frequency wave in far field source case is given by a multiplication of the directivity function of the first and the second primary waves. Accordingly, the directivity of the difference frequency wave becomes higher than that of the ultrasonic wave directly generated by the ultrasonic wave generator, the ultrasonic wave having the same size of frequency as that of the difference frequency wave. Further, the beam width becomes narrower, as the directivity increases.

Substantially, as the frequencies of the primary waves become larger for the fixed difference frequency wave, the directivity pattern of the difference frequency wave follows the directivity pattern of the Eq. 4 in low frequency area of the primary wave, however, becomes to follow the directivity pattern of the Eq. 3 in high frequency area of the primary wave.

Figure 2:
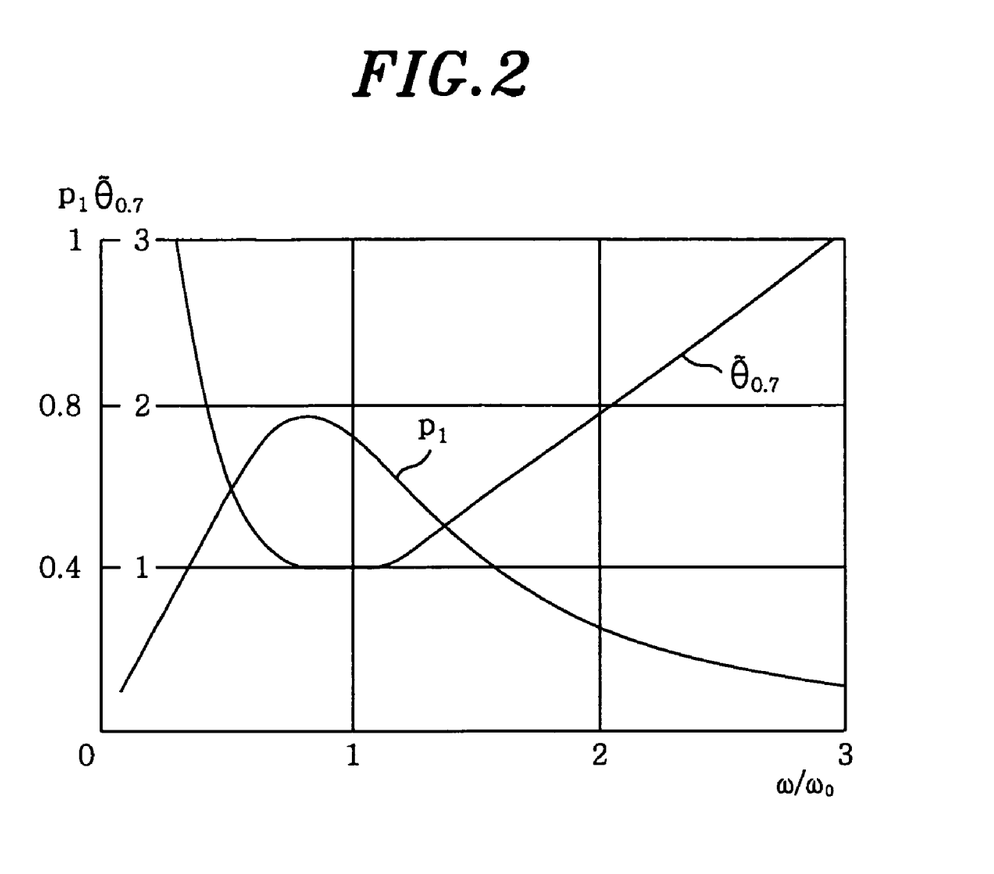
FIG. 2 illustrates a graph representing a relation between a beam width of the secondary wave and an operational frequency of the primary waves to show an area where the difference frequency wave having the narrowest beam width is created.

According to "Nonlinear underwater acoustics", (The American Institute of Physics, New York, 1987) authored by B. K. Novikov, O. V. Rudenko and V. I. Timoshenko, referring to FIG. 2, a normalized sound pressure $p_1$ and the normalized HPBW $\bar{\theta}_{0.7}$ of the difference frequency wave are plotted in a vertical axis in accordance with the frequency of the primary waves. In this way, the frequencies of the primary waves where the secondary wave has the narrowest beam width may be determined. Further, the most efficient non-linear effect is ascertained to happen at the determined frequency band thereof. Theoretically, assuming the Gaussian pressure distribution on the radiator, the frequency of the primary wave where the secondary wave has the narrowest beam width is given by:

$$\omega_0 \approx c_0 (2\pi f_d/ba^2)^{1/4} \qquad \text{Eq. 5,}$$

wherein $b = \alpha \rho_0 c_0^2 / 4\pi^2$, $\alpha$ is a attenuation constant of the primary wave, $\rho_0$ is the is the density of the medium, e.g., air, a is the radius of the generator, $c_0$ is the velocity of the ultrasonic wave and $f_d = f_1 - f_2$ is the difference frequency of the two primary waves. Further, the narrowest beam width is given by:

$$2\theta_{0.7} = \sqrt{2}(b/2\pi f_d a^2 \rho_0)^{1/4} \qquad \text{Eq. 6,}$$

wherein $b = \alpha \rho_0 c_0^2 / 4\pi^2$, $\rho_0$ is the density of the medium, e.g., air, $f_d$ is the difference frequency and a is the radius of the generator. In FIG. 2, a horizontal axis is the $\omega/\omega_0$, i.e., a frequency of the primary wave normalized by $\omega_0$, which is the frequency of the primary wave where the secondary wave has the narrowest beam width. Referring to FIG. 2, it is shown that, the normalized frequency $\omega/\omega_0$ where the narrowest beam width of the secondary wave exists is approximately located between about 0.8 and about 1.1. An operational frequency of the primary wave, which is defined as $f = (f_1 + f_2)/2$, may be determined within the range specified above to minimize the beam width of the secondary wave, thereby maximizing the directivity of the secondary wave.

Furthermore, the method of using the parametric array reduces the side lobe of the transmitted wave compared with the case of using the conventional ultrasonic wave generator such that the cross talk induced by the side lobe may be greatly diminished.

Figure 3A:
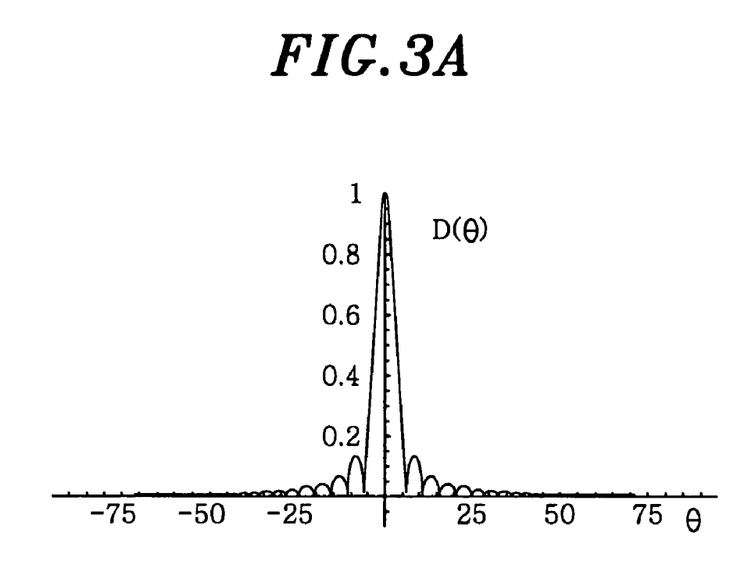
FIGS. 3A and 3B show a directivity pattern of the first and the second primary waves, respectively.
Figure 3B:
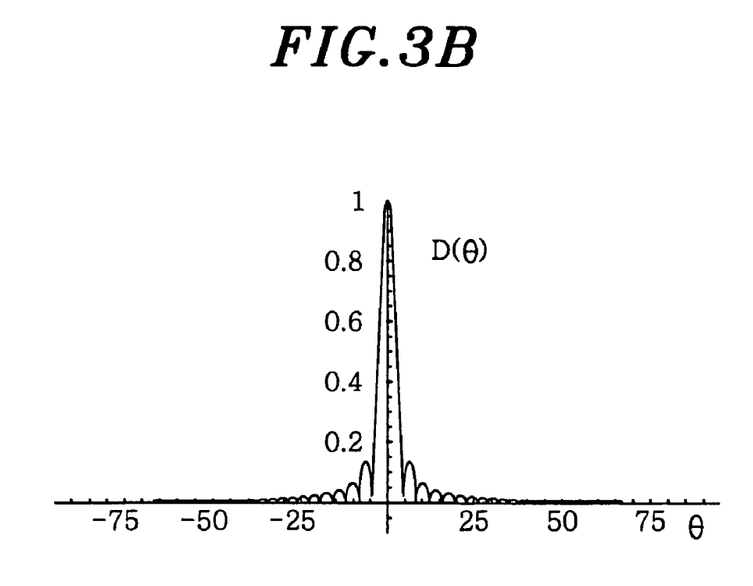
Figure 3C:
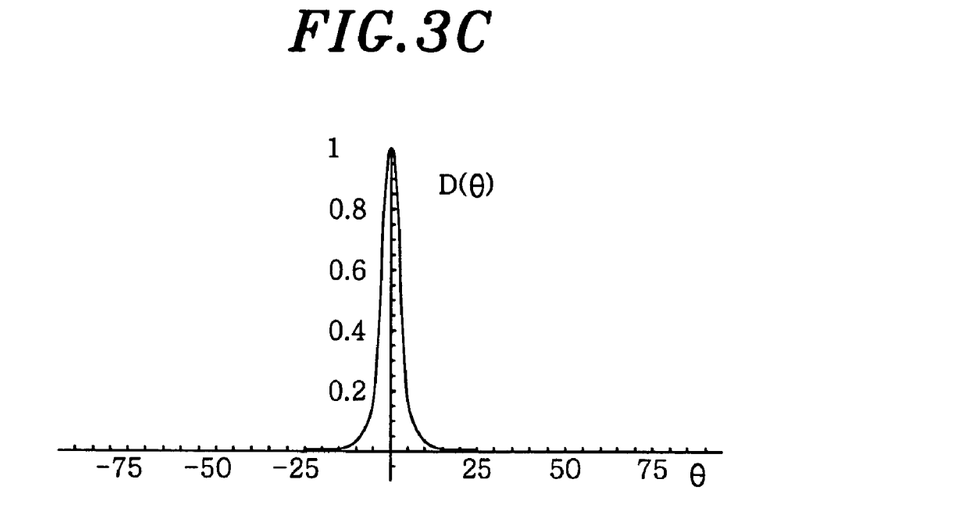
FIG. 3C shows a directivity pattern of the secondary wave having a difference frequency and FIG. 3D shows a directivity pattern of the wave which is directly transmitted by the conventional generator, a frequency of the wave being corresponding to the difference frequency.
Figure 3D:
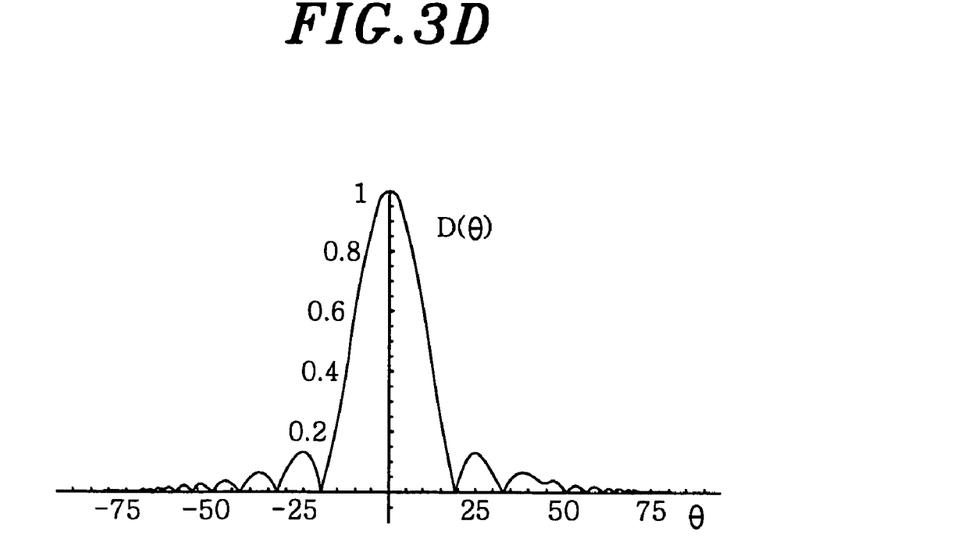

The suppression of the side lobe can be ascertained by simulation results using a Westervelt model shown in FIGS. 3A to 3D. FIGS. 3A to 3C represent the directivity pattern of the primary or the secondary waves when using the parametric array. FIG. 3A and FIG. 3B show the directivity pattern of the first and the second primary waves, respectively, and FIG. 3C shows the directivity pattern of the secondary wave of the difference frequency wave. Meanwhile, FIG. 3D presents the directivity pattern of the wave, of which the frequency is equal to the difference frequency wave, generated directly by the conventional ultrasonic wave generator. By comparing FIG. 3C with FIG. 3D, the side lobe is greatly suppressed for the case of using the difference frequency wave.

In the mean time, the efficiency of the difference frequency wave generation is proportional to a square of the difference between the two high frequency primary waves, as previously defined in Eq. 2. While, in a conventional underwater SONAR system, there are generally used two frequencies which are not so high and have a small difference therebetween as the primary waves such that the efficiency of the difference frequency wave generation is low. However, in accordance with one of the embodiments of the present invention, the difference frequency wave is chosen to be preferably ranging from about 20 kHz to about 60 kHz. Consequently, the high efficiency of the difference frequency wave generation is achievable, even though the air is used as a medium.

As the frequency range for the difference frequency wave, the frequency smaller than 20 kHz is overlapped with the audible frequency range such that the cross talk may occur owing to a plenty of an external sound noise and the frequency larger than 60 kHz becomes easily attenuated such that the measurable distance range is reduced. Herein, consequently, the frequency ranging from 20 kHz to 60 kHz is preferably used as a desirable difference frequency.

Hereinafter, there are provided two embodiments of the ultrasonic ranging system in accordance with the present invention with the references to FIGS. 4 and 5, respectively.

Figure 4:
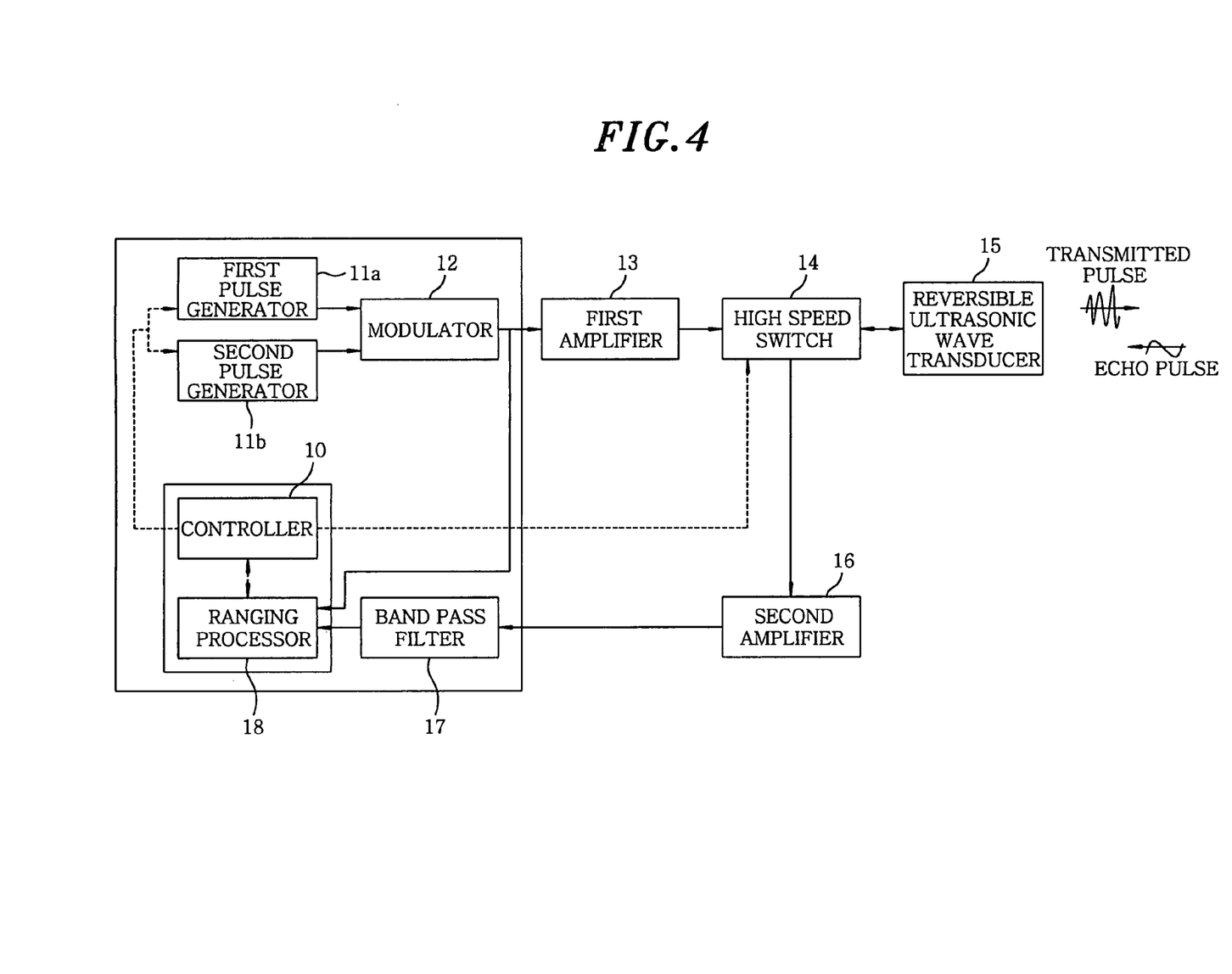
FIG. 4 provides a schematic block diagram of the distance ranging system using an ultrasonic wave transducer in accordance with one embodiment of the present invention.

Referring to FIG. 4, an ultrasonic wave transducer 15 having a wide frequency response characteristic is used as both an ultrasonic actuator and an ultrasonic sensor, simultaneously in a single body. In FIG. 5, to the contrary, an ultrasonic actuator and an ultrasonic sensor are configured into separate devices.

The ultrasonic ranging system of FIG. 4 includes a controller 10, a first pulse generator 11a, a second pulse generator 11b, a modulator 12, a first amplifier 13, a high speed switch 14, a reversible ultrasonic wave transducer 15, a second amplifier 16, a band pass filter 17 and a ranging processor 18.

For example, a plurality of control signals (e.g., three) are generated at the controller 10 triggered by a program or an external input signal (not shown) and one of the generated control signals is delivered to the ranging processor 18. At the reception of the control signal, the ranging processor is initialized and prepared to measure the distance. Another control signal is sent to the high speed switch 14 for an initialization thereof. The third control signal is inputted to the first and the second pulse generators 11a, 11b at the same time and triggers each of the first and the second pulse generators 11a, 11b to generate an electrical pulse signal having the frequency $f_1$ and $f_2$, respectively. Each envelope of the two generated pulse signals has a shape of exponential decaying, each of equations being given by $F_1(t) = \exp(-a_1 t) \sin(2\pi f_1 t)$ and $F_2(t) = \exp(-a_2 t) \sin(2\pi f_2 t)$, respectively, or a shape of Gaussian distribution, each of equations being given by $F_1(t) = G_1(t) \sin(2\pi f_1 t)$ and $F_2(t) = G_2(t) \sin(2\pi f_2 t)$, respectively, wherein $a_1$ and $a_2$ are the attenuation constants of the pulse signals generated by the first and the second pulse generators, and $G_1(t)$ and $G_2(t)$ are Gaussian distribution functions for the pulse signals generated by the first and the second pulse generators, respectively.

Next, two pulse signals are inputted to the modulator 12 and modulated by being superposed with each other such as $F_1(t) + F_2(t)$. In other words, the modulator 12 is implemented by using a voltage adding circuit. The modulated pulse signal is further sent to the ranging processor 18 and the first amplifier 13, simultaneously and the ranging processor 18 records a time of receiving the modulated pulse signal set to $T_0$. The modulated pulse signal sent to the first amplifier 13 is appropriately amplified to be appropriate to the input range of the reversible ultrasonic wave transducer 15 and delivered to the reversible ultrasonic wave transducer 15 via the high speed switch 14. At this point, after sending the signal to the reversible ultrasonic wave transducer 15, the high speed switch is changed into a reception mode by altering a gate of the switch thereof and opening the gate to the second amplifier 16.

Figure 6A:
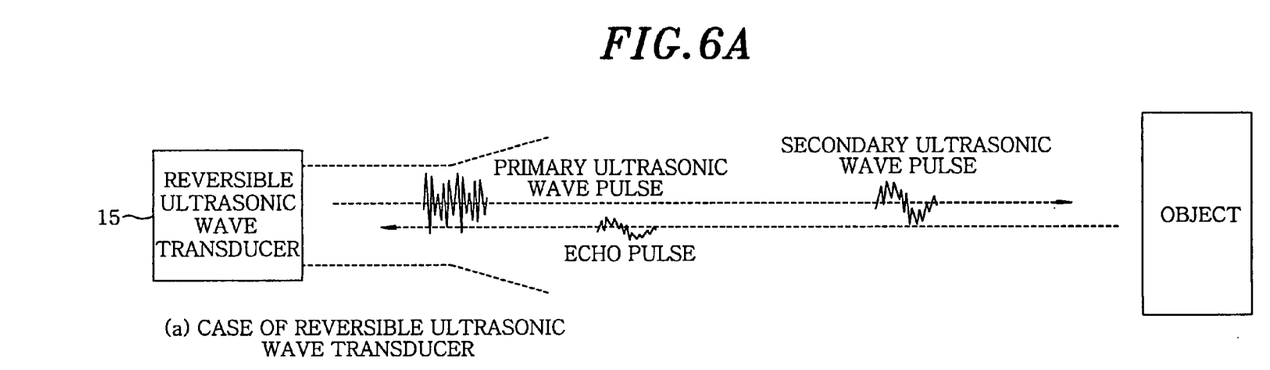
FIGS. 6A and 6B offer schematic views explaining the principle of the distance ranging method for the case of reversible ultrasonic wave transducer and ultrasonic wave actuator and sensor, respectively, in accordance with the embodiments of the present invention.
Figure 6B:
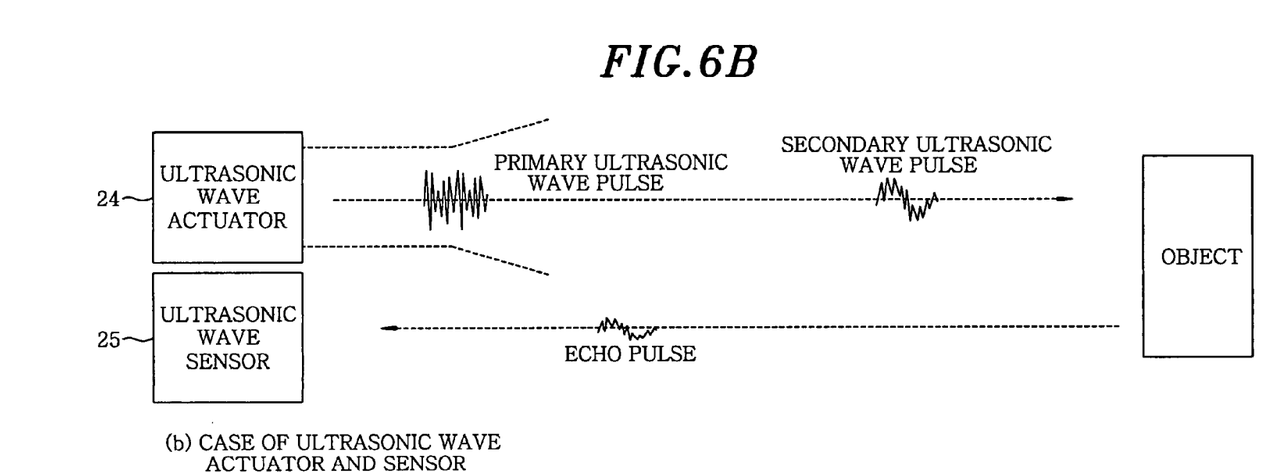

Sequentially, the reversible ultrasonic wave transducer 15 transforms the inputted pulse signal into a mechanical energy and transmits an ultrasonic pulse including two primary ultrasonic waves having a high SPL into the air. The ultrasonic wave transducer has a diameter of, e.g., about 15 mm to about 50 mm. From the transmitted primary waves, there is created the secondary wave having the difference frequency, of which the size preferably ranges from 20 kHz to 60 kHz, during the propagation therethrough and reflected to the object, resultantly, an echo pulse returns to the transducer 15. Among the returned echo pulse, comparatively low frequency signals are included in addition to the originally transmitted signal. Finally, the echo pulse comes to be detected by the transducer 15. The process described above is schematized in FIGS. 6A and 6B. The echo pulse detected by the reversible ultrasonic wave transducer 15 is transformed into an electrical received signal and then delivered to the second amplifier 16 via the high speed switch 14. At the second amplifier 16, the inputted electrical received signal is amplified to an extent of being processed appropriately by the ranging processor 18 and further sent to the band pass filter 17. The band pass filter 17 rectifies the electrical received signal, thereby the pure component of the difference frequency being delivered to the ranging processor 18.

Next, the ranging processor 18 records the detection time of the signal set to $T_1$. By using $T_1$ and the previously recorded $T_0$, the ranging processor 18 calculates the time the ultrasonic pulse has propagated through the air and then outputs the distance to the object. At this point, the distance Dis is calculated by:

$$Dis = 0.5 \times (T_1 - T_0 + T_{sys}) \times (c + c_{cal}) \qquad \text{Eq. 7,}$$

wherein $T_{sys}$ is a time correction constant which compensates an error occurred in an apparatus and $c_{cal}$ is a velocity correction constant which compensates the velocity of the ultrasonic wave adaptively to an propagation environment, and both constants can be obtained experimentally.

Figure 5:
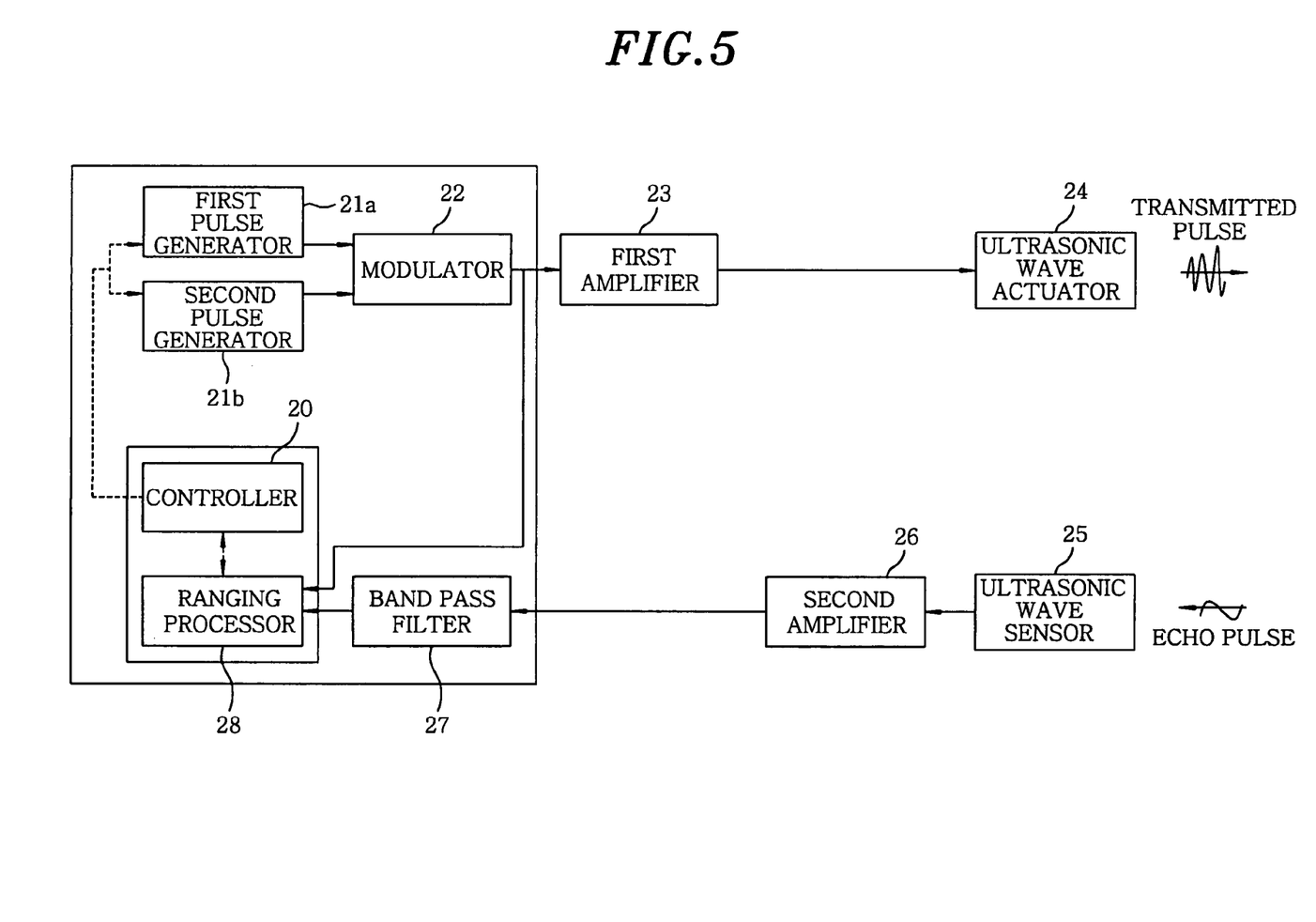
FIG. 5 represents a schematic block diagram of the distance ranging system using an ultrasonic wave actuator and an ultrasonic wave sensor in accordance with another embodiment of the present invention.

Compared with the above-described embodiment, another embodiment of the ultrasonic ranging system of FIG. 5 excludes the high speed switch 14 of FIG. 4 and includes an ultrasonic wave actuator 24 and an ultrasonic wave sensor 25 instead of the reversible ultrasonic wave transducer 15 as shown in FIG. 5. In this case, an ultrasonic pulse may be generated with high efficiency by the ultrasonic wave actuator 24 and the ultrasonic echo pulse may be detected with high sensitivity by the ultrasonic wave sensor 25.

Referring to FIG. 5, two control signals are generated at the controller 20 triggered by a program or an external input signal (not shown) and one of the generated control signals is delivered to the ranging processor 28. On receiving the control signal, the ranging processor is initialized and prepared to measure the distance. The other control signal is inputted to the first and the second pulse generators 21a, 21b at the same time, thereby each of the first and the second pulse generators 21a, 21b being triggered to generate an electrical pulse signal having the frequency $f_1$ and $f_2$, respectively.

Next, two pulse signals are inputted to the modulator 22 and modulated by being superposed with each other in a same way as described in the previous preferred embodiment. The modulated pulse signal is further sent to the ranging processor 28 and the first amplifier 23, simultaneously and the ranging processor 28 records a time of receiving the modulated signal set to $T_0$. The modulated pulse signal that is sent to the first amplifier 23 is further electrically amplified and the amplified pulse signal is delivered to the actuator 24. Finally, the actuator 24 transmits an ultrasonic pulse including two primary ultrasonic waves into the air.

From the transmitted primary waves, there is created a secondary wave having the difference frequency, the size of which preferably ranges from about 20 kHz to about 60 kHz, during the propagation through the air. The secondary wave is reflected to the object, and resultantly, an echo pulse returns to the sensor 25. Finally, the echo pulse comes to be detected by the sensor 25. The echo pulse detected by the sensor 25 is transformed into an electrical received signal and then delivered to the second amplifier 26. At the second amplifier 26, the inputted electrical received signal is amplified to an extent of being processed appropriately by the ranging processor 28 and further sent to the band pass filter 27. The band pass filter 27 rectifies the electrical received signal such that the pure component of the difference frequency wave is delivered to the ranging processor 28.

Next, the ranging processor 28 records the detection time of the signal set to $T_1$. By using $T_1$ and the previously recorded $T_0$, the ranging processor 28 calculates the time the ultrasonic pulse has propagated through the air and outputs the distance to the object according to the Eq. 7.

For each of embodiments described above, the controller 10, 20, and the ranging processor 18, 28 may be implemented into one processing unit by integration thereof. Further, the controller 10, 20, the ranging processor 18, 28, the first pulse generator 11a, 21a, the second pulse generator 11b, 21b, the modulator 12, 22, and band pass filter 17, 27 may be implemented into one processing unit by using a high integration technology. In the latter implementation, a D/A converter (not shown) may be inserted between the modulator 12, 22 and the first amplifier 13, 23 and an A/D converter (not shown) may be located between the second amplifier 16, 26 and the band pass filter 17, 27, additionally.

Meanwhile, the ultrasonic wave transducer is required to transmit the primary waves having the high frequency efficiently so that there should be created the difference frequency wave having high output power in the air. As the transducer to meet the requirement above, a pMUT (piezoelectric micro machined ultrasonic transducer), a cMUT (capacitive type micro machined ultrasonic transducer), an ultrasonic wave transducer using PVDF (Poly Vinylidene Fluoride), an electrostatic ultrasonic wave transducer and the like may be adopted in the preferred embodiments of the present invention.

The preferred embodiments of the present invention provide the system and the method thereof to reduce the beam width greatly compared with the conventional system and method and consequently, improve the spatial resolution in a distance measurement in the air. Furthermore, the side lobe is vastly suppressed such that the cross talk can be eliminated to a great extent. In this way, the precise measurement of the distance is achieved in the air.

While the invention has been shown and described with respect to the preferred embodiment, it will be understood by those skilled in the art that various changes and modification may be made without departing from the spirit and scope of the invention as defined in the following claims.

What is claimed is:

1. An ultrasonic ranging method for measuring a distance to an object in an air, comprising the steps of:
generating a first and a second primary ultrasonic waves having a frequency f1 and f2, respectively;
modulating the first and the second primary ultrasonic waves by superimposing the first and the second waves to generate a modulated wave;
transmitting the modulated wave through the air, wherein a secondary wave having a frequency corresponding to a difference of two frequencies fd=f1−f2 is created by a nonlinear property of the air and radiated to the object as a pulse shape;

detecting an echo pulse of the secondary wave reflected from the object; and measuring the distance to the object based on a propagation time of the secondary wave.

2. The ultrasonic ranging method of claim 1, wherein the frequency of the secondary ultrasonic wave ranges from 20 kHz to 60 kHz.

3. An ultrasonic ranging for measuring a distance to an object in an air, comprising the steps of:

generating a first and a second primary ultrasonic waves having a frequency f1 and f2. respectively;

transmitting the first and the second primary ultrasonic waves in a same through the air, wherein a secondary wave having a frequency corresponding to a difference of two frequencies fd=f1−f2 is created by a nonlinear Property of the air and radiated to the object as a pulse shape;

detecting an echo pulse of the secondary wave reflected from the object; and measuring the distance to the object based on a propagation time of the secondary wave, wherein an average frequency of the primary ultrasonic waves $f=(f_1+f_2)/2$ is chosen to satisfy an equation $0.8<2\pi f/\omega_0<1.1$, where $\omega_0=2\pi f_0$ is the average frequency of the primary ultrasonic waves when the secondary wave has the narrowest beam width, which is given by, $$\omega_0 \approx c_0(2\pi f_d/ba^2)^{1/4}$$

wherein $b=\alpha\rho_0 c_0^2/4\pi^2$, $\alpha$ is an attenuation constant of the primary waves, $\rho_0$ is a density of a medium, e.g., air, a is a radius of a ultrasonic wave generator, $c_0$ is a velocity of an ultrasonic wave and $f_d$ is the difference of frequencies of the primary ultrasonic waves.

4. An ultrasonic ranging system for measuring a distance to an object in an air, comprising:

a controller for initializing a device and generating a plurality of control signals;

a first and a second pulse generators, each of which simultaneously generates a first and a second pulse signals, respectively triggered by one of the control signals from the controller;

a modulator for producing a modulated pulse signal by superposing the first and the second pulse signals generated from each of the first and the second pulse generators;

a first amplifier for amplifying the modulated pulse signal;

a reversible ultrasonic wave transducer for transmitting an ultrasonic pulse into the air by transforming the amplified pulse signal into a mechanical energy, receiving an echo pulse reflected from the object and further transforming the echo pulse into a received electrical signal;

a second amplifier for amplifying the received electrical signal;

a high speed switch for forwarding the modulated pulse signal amplified by the first amplifier to the reversible ultrasonic transducer and delivering the received electrical signal from the reversible ultrasonic wave transducer to the second amplifier, respectively;

a band pass filter for selectively passing a low frequency signal component of the received electrical; and a ranging processor for calculating the distance to the object by using an input time of the modulated pulse signal from the modulator and an input time of the received electrical signal from the band pass filter.

5. The ultrasonic ranging system of claim 4, further comprising:

a D/A converter provided between the modulator and the first amplifier; and an A/D converter located between the second amplifier and the band pass filter.

6. The ultrasonic ranging system of claim 4, wherein an envelope of the ultrasonic wave pulse has a form of an exponential decaying or a Gaussian distribution.

7. The ultrasonic ranging system of claim 4, wherein the ultrasonic pulse includes two primary ultrasonic waves having a high frequency $f_1$ and $f_2$, respectively and a secondary ultrasonic wave having a low frequency corresponding to a difference of two frequencies $f_d=f_1-f_2$ is created by a nonlinear property of the air.

8. The ultrasonic ranging system of claim 7, wherein a frequency of the secondary ultrasonic wave ranges from about 20 kHz to about 60 kHz.

9. An ultrasonic ranging system for measuring a distance to an object in an air, comprising:

a controller for initializing a device and generating a plurality of control signals;

a first and a second pulse generators, each of which simultaneously generates a first and a second pulse signals, respectively triggered by one of the control signals from the controller;

a modulator for producing a modulated signal by superposing the first and the second pulse signals generated from each of the first and the second pulse generators;

a first amplifier amplifying the modulated pulse signal;

an ultrasonic wave actuator for transmitting an ultrasonic pulse into the air by transforming the amplified pulse signal into a mechanical energy;

an ultrasonic wave sensor for receiving an echo pulse reflected from the object and further transforming the echo pulse into a received electrical signal;

a second amplifier for amplifying the received electrical signal;

a band pass filter for selectively passing a low frequency signal component of the received electrical signal; and a ranging processor for calculating the distance to the object by using an input time of the modulated pulse signal from the modulator and an input time of the received electrical signal from the band pass filter.

10. The ultrasonic ranging system of claim 9, further comprising:

a D/A converter provided between the modulator and the first amplifier; and an AJD converter located between the second amplifier and the band pass filter.

11. The ultrasonic ranging system of claim 9, wherein an envelope of the ultrasonic wave pulse has a form of an exponential decaying or a Gaussian distribution.

12. The ultrasonic ranging system of claim 9, wherein the ultrasonic pulse includes two primary ultrasonic waves having a high frequency $f_1$ and $f_2$, respectively and a secondary ultrasonic wave having a low frequency corresponding to a difference of two frequencies $f_d=f_2$ is created by a nonlinear property of the air.

13. The ultrasonic ranging system of claim 12, wherein a frequency of the secondary ultrasonic wave ranges from about 20 kHz to about 60 kHz.

* * * * *